United States Patent
Hu et al.

(10) Patent No.: US 12,292,888 B1
(45) Date of Patent: May 6, 2025

(54) FAST AND ENERGY-EFFICIENT K-NEAREST NEIGHBOR (KNN) SEARCH ACCELERATOR FOR LARGE-SCALE POINT CLOUD

(71) Applicant: SHANGHAITECH UNIVERSITY, Shanghai (CN)

(72) Inventors: Yunhao Hu, Shanghai (CN); Yajun Ha, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 18/985,065

(22) Filed: Dec. 18, 2024

Related U.S. Application Data

(63) Continuation of application No. PCT/CN2024/118960, filed on Sep. 14, 2024.

(30) Foreign Application Priority Data

Jan. 11, 2024   (CN) .......................... 202410044699.5

(51) Int. Cl.
  *G06F 16/2453* (2019.01)
(52) U.S. Cl.
  CPC .............. *G06F 16/24542* (2019.01)
(58) Field of Classification Search
  CPC ................................................. G06F 16/24542
  See application file for complete search history.

(56) References Cited

U.S. PATENT DOCUMENTS

| | | | |
|---|---|---|---|
| 11,971,258 B2 * | 4/2024 | Liu | G01C 21/3826 |
| 2010/0106713 A1 | 4/2010 | Esuli et al. | |

(Continued)

FOREIGN PATENT DOCUMENTS

| | | |
|---|---|---|
| CN | 111860340 A | 10/2020 |
| CN | 112287185 A | 1/2021 |

(Continued)

OTHER PUBLICATIONS

Ji Zhang, et al., Low-drift and Real-time Lidar Odometry and Mapping, Autonomous Robots, 2017, pp. 1-17.

(Continued)

*Primary Examiner* — Dangelino N Gortayo
(74) *Attorney, Agent, or Firm* — Bayramoglu Law Offices LLC

(57) ABSTRACT

A fast and energy-efficient K-nearest neighbors search accelerator for a large-scale point cloud is provided. A nearest sub-voxel-selection (NSVS) framework that performs search based on a double-segmentation-voxel-structure (DSVS) search structure is constructed, and a K-nearest neighbors search algorithm for a large-scale point cloud map is implemented on a field programmable gate array (FPGA). The K-nearest neighbors search accelerator is configured for constructing the DSVS search structure, and searching for K-nearest neighbors based on the DSVS search structure. An experimental result on a KITTI dataset shows that the K-nearest neighbors search accelerator has a search speed 9.1 times faster than a state-of-the-art FPGA implementation. In addition, the K-nearest neighbors search accelerator also achieves an optimal energy efficiency, and the optimal energy efficiency is 11.5 times and 13.5 times higher than state-of-the-art FPGA and GPU implementations respectively.

5 Claims, 2 Drawing Sheets

(56) References Cited

U.S. PATENT DOCUMENTS

2022/0148281 A1* 5/2022 Sun .................. G06V 20/56
2023/0195803 A1* 6/2023 Ahn ............. G06F 16/90335
707/770

FOREIGN PATENT DOCUMENTS

| CN | 114240729 A | 3/2022 |
| CN | 117788591 A | 3/2024 |

OTHER PUBLICATIONS

Yiming Li, et al., A Knn Accelerator Based on Approximate K-D Tree for ICP, 2022 International Conference on Image Processing and Media Computing (ICIPMC), 2022, pp. 124-128.
Faquan Chen, et al., ParalleINN: A Parallel Octree-based Nearest Neighbor Search Accelerator for 3D Point Clouds, 2023 IEEE International Symposium on High-Performance Computer Architecture (HPCA), 2023, pp. 403-414.
Hao Sun, et al., Efficient FPGA Implementation of K-Nearest-Neighbor Search Algorithm for 3D LIDAR Localization and Mapping in Smart Vehicles, IEEE Transactions on Circuits and Systems II: Express Briefs, 2020, pp. 1644-1648, vol. 67, No. 9.

* cited by examiner

FAST AND ENERGY-EFFICIENT K-NEAREST NEIGHBOR (KNN) SEARCH ACCELERATOR FOR LARGE-SCALE POINT CLOUD

CROSS REFERENCE TO THE RELATED APPLICATIONS

This application is the continuation application of International Application No. PCT/CN2024/118960, filed on Sep. 14, 2024, which is based upon and claims priority to Chinese Patent Application No. 202410044699.5, filed on Jan. 11, 2024, the entire contents of which are incorporated herein by reference.

TECHNICAL FIELD

The present disclosure relates to a K-nearest neighbors search accelerator for a large-scale point cloud.

BACKGROUND

As an important step in a large number of lidar algorithms, K-nearest neighbors search is widely used in a simultaneous localization and mapping algorithm to correct a localization drift error, and matches a frame of lidar point cloud with an entire point cloud map to re-locate user-side and other related algorithms. Although a K-nearest neighbors search algorithm has a relatively simple structure, the K-nearest neighbors search algorithm occupies approximately 80% of time in a matching process due to a large number of query operations in a large-scale point cloud map [1].

Considering a real-time requirement of the simultaneous localization and mapping algorithm in a complex outdoor scenario, as well as a strict constraint of an autonomous vehicle on a battery, developing an energy-efficient algorithm for fast searching K-nearest neighbors is a huge challenge.

In order to improve performance of the K-nearest neighbors algorithm and reduce a power consumption, relevant experts have performed explorations in different aspects. A series of works such as [2] and [3] proposed a parallel pipeline K-nearest neighbors search algorithm based on a tree data structure. However, it only achieves a high search speed on a small-scale point cloud map. KD-tree construction time for the large-scale point cloud map is excessively long, which is unacceptable for the autonomous vehicle. In [4], a double-segmentation-voxel-structure (DSVS)-based hardware accelerator for K-nearest neighbors search has been proposed, which can quickly construct the large-scale point cloud map. The DSVS-based hardware accelerator for K-nearest neighbors search adaptively sets a side length to segment a space in which the point cloud is located into voxels, and further segments a dense voxel into sub-voxels. A DSVS can reduce a search area to a nearby (sub) voxel when dealing with massive and uneven point clouds. However, due to slow data transmission and redundant search areas, the DSVS performs slowly and inefficiently in the large-scale point cloud map. In addition, most K-nearest neighbors implementations such as [2] [4] can only handle a medium-sized point cloud map containing up to approximately 400,000 points, and thus are only suitable for inter-frame matching or local map matching. Search in the large-scale point cloud map may lead to problems such as long search algorithm construction time, long point cloud transmission time, complex search operations, and large search areas.

CITED REFERENCES

[1] J. Zhang and S. Singh, "Low-drift and real-time lidar odometry and mapping," Autonomous Robots, vol. 41, pp. 401-416, February 2017.

[2] Y. Li, K. Zheng, and H. Xiao, "A knn accelerator based on approximate k-d tree for icp," in 2022 International Conference on Image Processing and Media Computing (ICIPMC), 2022, pp. 124-128.

[3] F. Chen, R. Ying, J. Xue, F. Wen, and P. Liu, "Parallelnn: A parallel octree-based nearest neighbor search accelerator for 3d point clouds," in 2023 IEEE International Symposium on High-Performance Computer Architecture (HPCA), 2023, pp. 403-414.

[4] H. Sun, X. Liu, Q. Deng, W. Jiang, S. Luo, and Y. Ha, "Efficient fpga implementation of k-nearest-neighbor search algorithm for 3d lidar localization and mapping in smart vehicles," IEEE Transactions on Circuits and Systems II: Express Briefs, vol. 67, no. 9, pp. 1644-1648, 2020.

SUMMARY

Technical problems to be solved by the present disclosure are redundant search areas and slow data transmission in a large-scale point cloud map.

In order to solve the above technical problems, the technical solution of the present disclosure is to provide a fast and energy-efficient K-nearest neighbors search accelerator for a large-scale point cloud, where an NSVS framework is constructed to perform search based on a DSVS search structure, and a K-nearest neighbors search algorithm for a large-scale point cloud map is implemented on a field programmable gate array (FPGA), where the fast and energy-efficient K-nearest neighbors search accelerator is configured for:

constructing the DSVS search structure, including:
  segmenting a space in which a reference set is located into different voxels, where each voxel has a side length equal to an expected search range Rin, and when a K-nearest neighbors result exceeds the expected search range Rin, the K-nearest neighbors result is considered as an outlier;
  further segmenting, based on a quantity of points in each voxel, a voxel containing multiple points into sub-voxels; and
  sorting the reference set to ensure that a point in an adjacent voxel or an adjacent sub-voxel is stored in a contiguous memory;

searching for K-nearest neighbors based on the DSVS search structure, including:
  a first function module: locating a query point, and using different strategies to reduce a search range based on a position of the query point, where
    when an adjacent voxel of a voxel containing the query point is not further segmented into sub-voxels, the adjacent voxel is used as a search voxel;
    when the adjacent voxel of the voxel containing the query point is further segmented into sub-voxels, only a sub-voxel nearest to the voxel containing the query point in the adjacent voxel is selected as a search sub-voxel; and
    the search voxel and the search sub-voxel form a reduced search area;
  a second function module: extracting candidate neighboring points within the reduced search area, where a data reuse rate is defined, and the data reuse rate is a ratio of a quantity of query points to a quantity of reference points in a search area;

when the data reuse rate exceeds a threshold, the reference set is accessed sequentially using a data reuse buffer, where the data reuse buffer is continuously updated based on a change in the query point to ensure that a point around a current query point is always in the data reuse buffer; and when the data reuse rate is lower than the threshold, the candidate neighboring points are obtained from an external memory in a random access mode; and a third function module: using a highly parallel K-nearest neighbors selection accelerator to select the K-nearest neighbors from the candidate neighboring points obtained by the second function module; and executing a task of constructing the DSVS search structure at a processor system (PS) end, and accelerating a task of searching for the K-nearest neighbors based on the DSVS search structure at a programmable logic (PL) end.

Preferably, the voxel and the sub-voxel are respectively indexed by using a hash value and a sub_hash value.

Preferably, there are at most 17 search voxels or search sub-voxels in total.

Preferably, in the second function module, when the candidate neighboring points of the query point have already been stored in the data reuse buffer in a previous query point search process, the candidate neighboring points are directly obtained from the data reuse buffer.

Preferably, an interval of the first function module, the second function module and the third function module is optimized to one cycle, and a data channel between the first function module, the second function module and the third function module is implemented as a stream type to enable a task-level pipeline.

The present disclosure proposes an FPGA implementation of a DSVS-based energy-efficient and fast K-nearest neighbors search algorithm for a large-scale point cloud map. Compared with the prior art, the present disclosure has following innovative points:

1) A new search technique (nearest sub-voxel-selection ((NSVS)) that reduces redundant search areas based on a proximity distribution and a density of a query point in a search structure. When the query point is located in a dense area with many points, the present disclosure will significantly reduce a search area.

2) An adaptive data transmission technique, which effectively transmits point cloud maps with different data reuse rates from an external memory to an accelerator. A point cloud map with a low data reuse rate is transmitted in a random access mode through a plurality of large-bit-width ports, while a point cloud map with a high data reuse rate is transmitted in a sequential access mode through an on-chip cache and an FIFO.

An experimental result on a KITTI dataset shows that the K-nearest neighbors search accelerator proposed in the present disclosure has a search speed 9.1 times faster than a state-of-the-art FPGA implementation. In addition, the solution of the present disclosure also achieves optimal energy efficiency, and the accelerator proposed in the present disclosure has energy efficiency 11.5 times and 13.5 times higher than state-of-the-art FPGA and GPU implementations respectively.

BRIEF DESCRIPTION OF THE DRAWINGS

FIG. 2A illustrates the search area of the DSVS, FIG. 2B illustrates a search area of an NSVS technique in a scenario A, and FIG. 2C illustrates a search area of the NSVS technique in a scenario B.

DETAILED DESCRIPTION OF THE EMBODIMENTS

The present disclosure will be further described in detail below in connection with specific embodiments. It should be understood that these embodiments are only intended to describe the present disclosure, rather than to limit the scope of the present disclosure. In addition, it should be understood that various changes or modifications may be made on the present disclosure by those skilled in the art after reading the content of the present disclosure, and these equivalent forms also fall within the scope defined by the appended claims of the present disclosure.

In order to fast search for K-nearest neighbors in a large-scale point cloud map, an NSVS framework proposed in the present disclosure includes two parts: constructing a DSVS search structure, and searching for K-nearest neighbors based on the DSVS.

In a first part, the DSVS search structure is constructed.

Figure 2A:
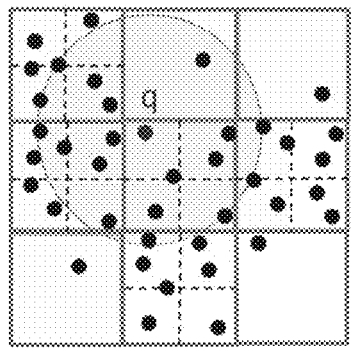
FIG. 2A to FIG. 2C illustrate search areas of a DSVS and an NSVS in a two-dimensional example, where

As shown in FIG. 2A, the embodiments of the present disclosure first segment space in which a reference set is located into a large number of voxels (as shown by solid lines in FIG. 2A to FIG. 2C), and each voxel has a side length equal to expected search range Rin. If a K-nearest neighbors result exceeds the expected search range Rin, the K-nearest neighbors result is considered as an outlier. Then, the embodiments of the present disclosure calculate a quantity of points in each voxel, and further segment a dense voxel containing multiple points into sub-voxels (as shown by dashed lines in FIG. 2A to FIG. 2C). Finally, the embodiments of the present disclosure sort the reference set to ensure that a point in an adjacent voxel or an adjacent sub-voxel is stored in a contiguous memory, so as to achieve fast retrieval. The voxel and the sub-voxel are respectively by using a hash value and a sub_hash value.

In a second part, the K-nearest neighbors are searched for.

The embodiments of the present disclosure first find query point q by calculating the hash value and the sub_hash value. Next, the embodiments of the present disclosure reduce a search area into several voxels and sub-voxels by using a provided NSVS technique, as shown by a dark area in FIG. 2B. Then, candidate neighboring points are extracted in a reduced search area by using an adaptive data transmission technique provided in the present disclosure. The embodiments of the present disclosure use three 512-bit high-performance interfaces, and each interface is independently responsible for transmitting position coordinates of a point in an X, Y, or Z direction to maximize a transmission rate. Finally, the K-nearest neighbors are selected from the candidate neighboring points.

Figure 1:
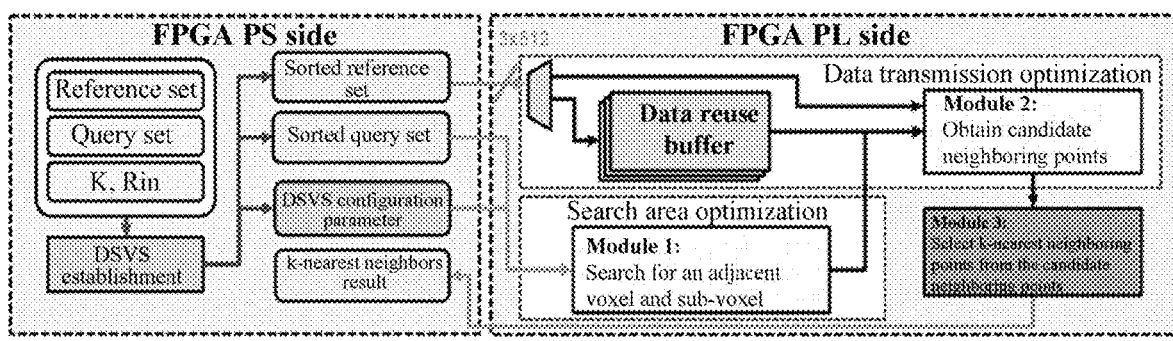
FIG. 1 is a flowchart of an NSVS search algorithm and also shows a hardware architecture.

The embodiments of the present disclosure implement the NSVS framework on a heterogeneous system. This heterogeneous system has a powerful PS (CPU) and PL (programmable logic), as shown in FIG. 1. Through an HLS analysis tool, it is discovered that DSVS construction is not a computationally-intensive task. Therefore, the embodiments of the present disclosure choose to execute a construction task at a PS end and accelerate a complicated K-nearest neighbors search task at a PL end.

A K-nearest neighbors search accelerator mainly has the following four parts:

1. Data reuse buffer: It is an on-chip cache for a large-scale reference set.

A data reuse rate is defined as a ratio of a quantity of query points to a quantity of reference points. When the data reuse rate exceeds a threshold, the reference set is accessed sequentially using the data reuse buffer. When the data reuse rate is lower than the threshold, the reference set is directly and randomly accessed through a plurality of large-bit-width ports. For a small reference set with a point cloud scale being at most 400,000 points, the query point is densely distributed in the reference set, thereby achieving a high data reuse rate. In this case, the embodiments of the present disclosure use a customized data reuse buffer. After point cloud sorting, points in a same voxel and sub-voxel are sequentially placed in a physically continuous memory. Therefore, cyclic partitioning is performed on a block ram on an FPGA to simultaneously access the points in the same voxel or sub-voxel. The data reuse buffer is continuously updated based on a change in the query point to ensure that a point around a current query point is always in the data reuse buffer. If a candidate neighbor of the query point has already been stored in the data reuse buffer in a previous query point search process, the candidate neighbor can be directly obtained from the data reuse buffer. This reduces a total amount of data transmitted from an external memory. However, when the data reuse rate is low, the query point may be sparsely distributed, resulting in few common candidate neighbors between adjacent query points. Therefore, for a super-large reference set with a maximum size of 6 million points, the embodiments of the present disclosure choose to obtain the candidate neighbor from the external memory in a random access mode. The candidate neighbor of the query point only includes a small portion of the reference set, and there is no need to transmit other reference points from the external memory to the accelerator. Therefore, the solutions disclosed in the embodiments of the present disclosure automatically select a faster transmission mode based on the data reuse rate, thereby increasing robustness of the present disclosure to different datasets.

2. Function module 1: The query point is located, and a search range is reduced.

The embodiments of the present disclosure use different strategies to reduce the search range based on a position of the query point. When the query point is located in the sub-voxel, in other words, in a dense area with many reference points, the present disclosure significantly reduces the search area.

3. Function module 2: Candidate neighboring points are extracted based on the search area obtained by the function module 1.

The candidate neighboring points may come from the data reuse buffer or directly from the external memory, depending on the data reuse rate.

4. Function module 3: A highly parallel K-nearest neighbors selection accelerator is used to select the K-nearest neighbors from the candidate neighboring points obtained by the function module 2.

The embodiments of the present disclosure optimize the interval of the three hardware functions to one cycle, and implement a data channel between the functions as a stream type to enable a task-level pipeline.

FIG. 2A to FIG. 2C and FIG. 3 illustrate how to reduce a quantity of candidate neighbors based on an NSVS, which further includes two steps:

Step 1: Only a closest sub-voxel is selected from each adjacent voxel of a voxel containing the query point.

Step 2: 17 closest search voxels and search sub-voxels are selected from the voxels and sub-voxels in the step 1.

For example, in the embodiments of the present disclosure, the search area is limited to a total of 3×3×3=27 voxels around the query point. In a DSVS data structure, it is difficult to control a quantity of sub-voxels because all sub-voxels within a search sphere with a radius of Rin are selected in the DSVS data structure. An uncertainty of the quantity of sub-voxels increases a difficulty of hardware implementation. Therefore, in the NSVS, if an adjacent voxel is further divided into sub-voxels, the embodiments of the present disclosure select only a sub-voxel nearest to the voxel containing the query point. Reasons are as follows:

1) Segmenting a voxel into sub-voxels means that the voxel is very dense. Other farther sub-voxels can be ignored as they have a little impact on accuracy.

2) Regardless of whether a voxel is segmented into sub-voxels, there are at most 27 search voxels or search sub-voxels in total, which reduces logical complexity and is beneficial for the hardware implementation.

There are two scenarios when the closest sub-voxel is selected:

Scenario A: The voxel containing the query point is not further segmented into sub-voxels.

Scenario B: The voxel containing the query point is further segmented into sub-voxels.

Figure 2B:
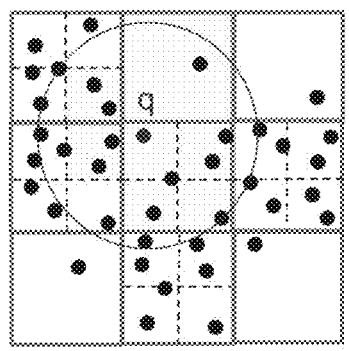
Figure 2C:
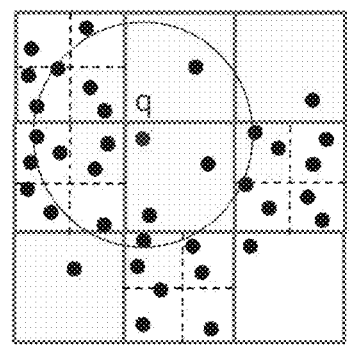

FIG. 2A to FIG. 2C provide a simplified two-dimensional example. As shown in FIG. 2A, the DSVS proposed in the present disclosure selects all the voxels and sub-voxels within the search sphere as the search area. A voxel and sub-voxel in a dark area in FIG. 2B are a search area for the scenario A, and a voxel and sub-voxel in a dark area in FIG. 2C are a search area for the scenario B. In the scenario B, the search area can be further reduced. Because points in a central voxel are very dense, it is almost impossible for five voxels in a lower right corner to contain the K-nearest neighbors of the point q. Therefore, due to the NSVS technique, a quantity of search areas is reduced from 19 to 8 in the scenario A and reduced to 7 in the scenario B. In a three-dimensional scenario, a quantity of search voxels and search sub-voxels is 27 in the scenario A and 17 in the scenario B.

Figure 3:
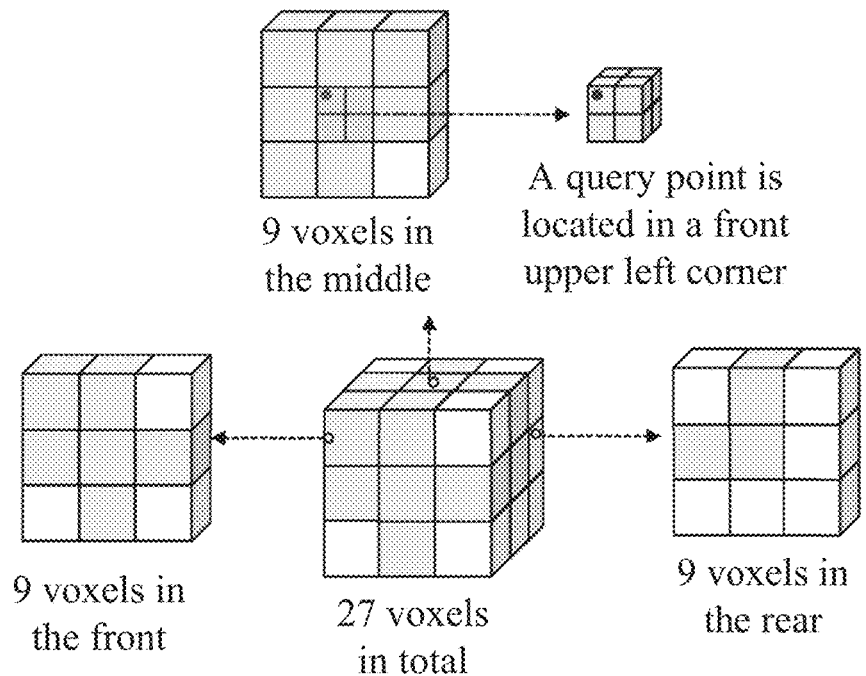
FIG. 3 illustrates 17 voxels added to a search area when a query point is located in an upper left corner of a central voxel.

In order to further achieve a load balance for the hardware implementation, as shown in FIG. 3, the embodiments of the present disclosure further reduce the quantity of search voxels and search sub-voxels in the scenario A to 17. At first, the embodiments of the present disclosure determine positions of the query point relative to a voxel center point in a total of eight areas. Then, the closest 17 voxels or sub-voxels are added to the search area based on the position of the query point. For example, if the query point is located in an upper left corner of the central voxel, the closest 17 voxels are shown in FIG. 3.

The above solutions can be applied to a K-nearest neighbors search step in a simultaneous localization and mapping process of autonomous driving or robots. A point cloud may be constituted by data of a lidar. For different types of datasets, the solutions provided in the present disclosure can accurately and quickly complete a K-nearest neighbors search task. Acceleration of the FPGA makes the entire algorithm to have better real-time performance and consume less energy.

The invention claimed is:

1. A fast and energy-efficient K-nearest neighbors search accelerator for a large-scale point cloud, wherein a nearest sub-voxel-selection (NSVS) framework is constructed to perform search based on a double-segmentation-voxel-structure (DSVS) search structure, and a K-nearest neighbors search algorithm for a large-scale point cloud map is implemented on a field programmable gate array (FPGA), wherein the fast and energy-efficient K-nearest neighbors search accelerator is configured for:

constructing the DSVS search structure, comprising:

segmenting a space in which a reference set is located into different voxels, wherein each voxel has a side length equal to an expected search range Rin, and when a K-nearest neighbors result exceeds the expected search range Rin, the K-nearest neighbors result is considered as an outlier;

further segmenting, based on a quantity of points in each voxel, a voxel containing multiple points into sub-voxels; and sorting the reference set to ensure that a point in an adjacent voxel or an adjacent sub-voxel is stored in a contiguous memory;

searching for K-nearest neighbors based on the DSVS search structure, comprising:

a first function module: locating a query point, and using different strategies to reduce a search range based on a position of the query point, wherein when an adjacent voxel of a voxel containing the query point is not further segmented into sub-voxels, the adjacent voxel is used as a search voxel;

when the adjacent voxel of the voxel containing the query point is further segmented into sub-voxels, only a sub-voxel nearest to the voxel containing the query point in the adjacent voxel is selected as a search sub-voxel; and the search voxel and the search sub-voxel form a reduced search area;

a second function module: extracting candidate neighboring points within the reduced search area, wherein a data reuse rate is defined, and the data reuse rate is a ratio of a quantity of query points to a quantity of reference points in a search area;

when the data reuse rate exceeds a threshold, the reference set is accessed sequentially using a data reuse buffer, wherein the data reuse buffer is continuously updated based on a change in the query point to ensure that a point around a current query point is always in the data reuse buffer; and when the data reuse rate is lower than the threshold, the candidate neighboring points are obtained from an external memory in a random access mode; and a third function module: using a highly parallel K-nearest neighbors selection accelerator to select the K-nearest neighbors from the candidate neighboring points obtained by the second function module; and executing a task of constructing the DSVS search structure at a processor system (PS) end, and accelerating a task of searching for the K-nearest neighbors based on the DSVS search structure at a programmable logic (PL) end.

2. The fast and energy-efficient K-nearest neighbors search accelerator for the large-scale point cloud according to claim 1, wherein the voxel and the sub-voxel are respectively indexed by using a hash value and a sub_hash value.

3. The fast and energy-efficient K-nearest neighbors search accelerator for the large-scale point cloud according to claim 1, wherein there are at most 17 search voxels or search sub-voxels in total.

4. The fast and energy-efficient K-nearest neighbors search accelerator for the large-scale point cloud according to claim 1, wherein in the second function module, when the candidate neighboring points of the query point have already been stored in the data reuse buffer in a previous query point search process, the candidate neighboring points are directly obtained from the data reuse buffer.

5. The fast and energy-efficient K-nearest neighbors search accelerator for the large-scale point cloud according to claim 1, wherein an interval of the first function module, the second function module and the third function module is optimized to one cycle, and a data channel between the first function module, the second function module and the third function module is implemented as a stream type to enable a task-level pipeline.

* * * * *